Figure 1:
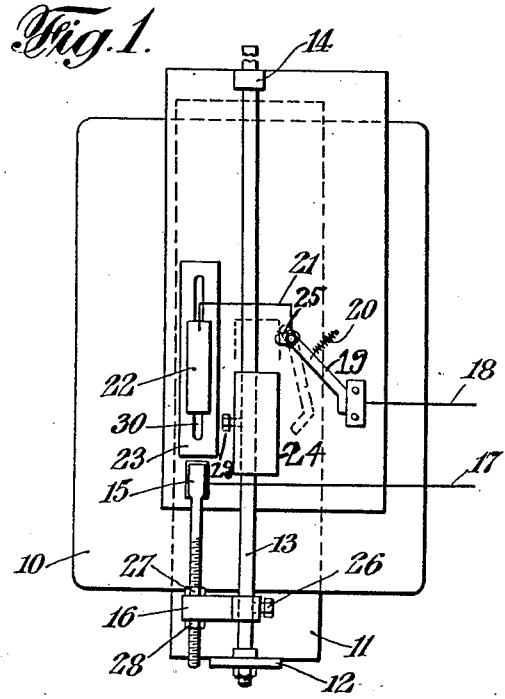

March 7, 1933.    A. A. SMITH    1,899,991
ELECTRIC WELDING APPARATUS
Filed Oct. 7, 1929

INVENTOR
Albert A. Smith.
BY
HIS ATTORNEYS

Patented Mar. 7, 1933

1,899,991

UNITED STATES PATENT OFFICE

ALBERT A. SMITH, OF RIVERDALE, NEW JERSEY, ASSIGNOR TO METROPOLITAN ENGINEERING COMPANY, OF BROOKLYN, NEW YORK, A CORPORATION OF NEW YORK

ELECTRIC WELDING APPARATUS

Application filed October 7, 1929. Serial No. 397,843.

This invention relates to electric welding apparatus and particularly to switch mechanisms for controlling the pressure and welding currents of electric butt welding apparatus.

In apparatus of this type the pressure and welding currents are controlled by electric circuits, for example, by means of large magnetic switches which are in turn controlled by smaller magnetic switches under the control of push buttons. The operation is automatic except for the push buttons. The switches on both circuits close at approximately the same rate but the pressure will not be applied as soon as the welding current because the lag of the magnetic pressure applying coils or equivalent mechanism is greater than the lag of the current in the welding transformer and also because of the inertia of the machine. Thus the welding current is applied before the pressure reaches the desired point and the metal comes to a welding temperature before the proper pressure is reached. This will cause the metal to overheat and burn out, thus producing a poor weld.

For a given current the heating is more rapid, the smaller the cross section of the parts at the welding areas and consequently when a machine designed for welding large objects is applied to smaller ones the lag between heating and pressure is increased, with correspondingly increased difficulties.

An object of the present invention is to provide a control means for apparatus of the above type in which an accurate and adjustable control of the timing of the heating and pressure effects is obtained.

Other objects of the invention are to provide means for controlling the application of pressure and welding current, in electric butt welding apparatus, in which the welding current is not applied until the pressure has been built up to the desired point, to provide means of the above type in which the lag between the application of the welding current and the application of pressure may be made definite and certain for various welding areas and in which the lag may be varied at will, and to provide a control device for apparatus of the above type in which the welding current may be applied at any desired stage in the application of pressure, from the lightest to the heaviest. The invention also provides a better and more uniform weld through areas of varying cross section and, by applying the pressure before, or simultaneously with, the welding current, causes a better and tighter fit between the casting to be welded and the copper electrode and thus less heating and burning of the electrodes while the electrode current is applied.

The various features of the invention are illustrated in the accompanying drawing in which:—

Figure 2:
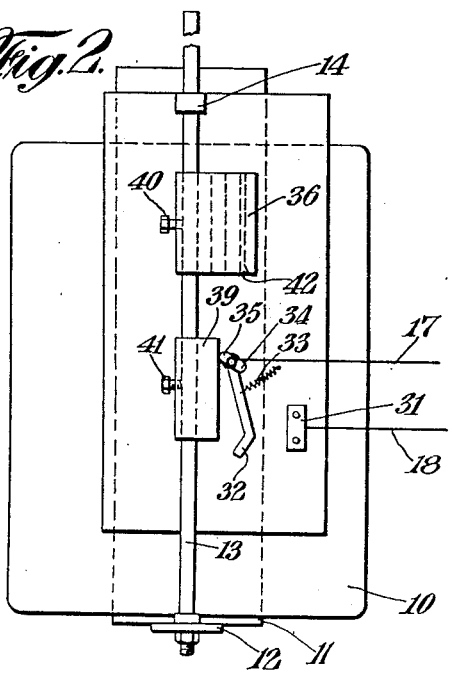
Figure 3:
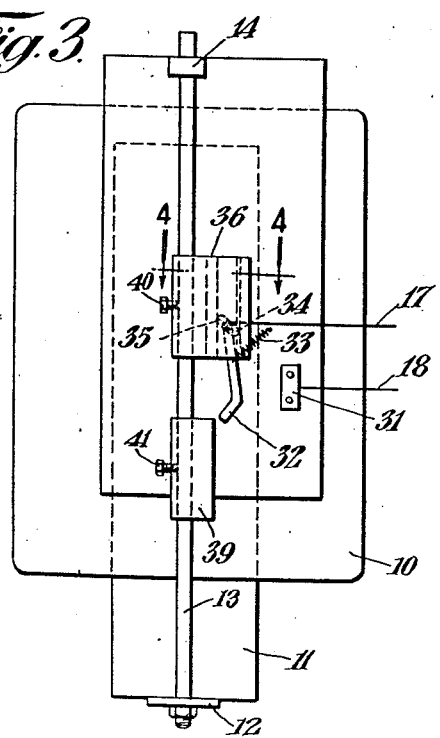
Figure 4:
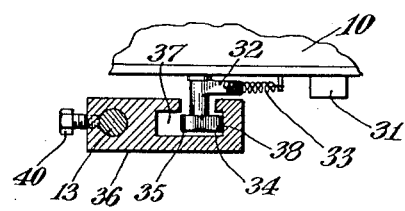

Fig. 1 is an elevation of a control element embodying a preferred form of the invention;

Figs. 2 and 3 are similar views of a modified form of the invention showing the various elements in different operative positions, and Fig. 4 is a cross sectional view of a part of the control mechanism of Figs. 2 and 3, taken on line 4—4 of Fig. 3.

The invention is illustrated in the accompanying drawing as applied to magnetic pressure applying mechanism of an electric butt welding apparatus and actuated by the moving elements of such mechanism. For example, it is shown in the accompanying drawing mounted on a pressure applying solenoid 10 of the welding apparatus and actuated by a vertically movable iron core 11. When pressure is applied to the objects to be welded the core 11 moves upwardly and carries with it a cross bar or plate 12 that projects beyond the periphery of the solenoid and carries a vertical rod 13 slidable in a guide 14 on the side of the solenoid. As the rod 13 is moved vertically by the solenoid core 11, it carries with it a sliding contact 15, Fig. 1, adjustably mounted on a bracket or clamp 16 secured to the rod 13. The contact 15 is connected to a wire 17 forming a part of the circuit of the magnetic switches that control the welding current.

The other wire 18 of the magnetic current controlling switch is connected through a pivoted switch 19, held closed by a spring 20, and through a connecting wire 21 to a fixed contact 22 movably mounted on an insulating plate 23 on the solenoid 10. As the sliding contact 15 is moved upwardly by the solenoid core 11 and the associated carrying elements 12, 13 and 16, it contacts with the fixed contact 22 and closes the circuit between the wires 17 and 18, thereby actuating the magnetic switch to close the welding current circuit. The magnetic switch circuit thereupon remains closed through the contacts 15 and 22 until a sliding block 24 mounted on the rod 13 engages a projecting arm 25 on the switch 19 and swings it to open position as shown in broken lines in Fig. 1.

The bracket or clamp 16 is supported on the rod 13 in such a manner that it may be adjusted vertically so that the sliding contact 15 may contact with the fixed contact 22 and close the welding current switches at any desired point in the upward movement of the core 11. For this purpose the bracket is secured to the rod 13 by clamping bolts 26 which may be loosened to permit the bracket to be raised or lowered. A finer adjustment of the position of the sliding contact 15 relative to the solenoid 11 may be obtained by means of nuts 27 and 28 threaded onto the threaded stem of the contact 15 and engaging opposite edges of the bracket 16.

The length of time of passage of the welding current may be controlled by adjusting the block 24 on the rod 13 so that it engages and tilts the switch 19 at an earlier or later period in the upward movement of the solenoid core. For this purpose the block 24 is secured on the rod 13 by means of tightening screws 29 that may be loosened to provide vertical adjustment. The timing of the welding circuit may also be facilitated by a vertical adjustment of the fixed contact plate 22 on the insulating plate 23. For this adjustment the insulating plate 23 is provided with a vertical slot 30.

Through an adjustment of the above means the welding current may be closed and opened at any desired points in the movement of the solenoid core and accordingly in the movement of the electrodes. As the pressure of the electrodes on the pieces to be welded increases with the movement of the core 11 the pressure range during which the welding current is applied may thus be accurately controlled.

In the embodiment of the invention as shown in Figs. 2, 3 and 4, the opening and closing of the circuit controlling the welding current is accomplished by a single switch comprising a fixed contact 31, which is directly connected to the circuit wire 18, and a pivoted contact 32, which is connected to the circuit wire 17. The contact arm 32 is urged to a position to contact with the fixed contact 31 by means of a spring 33 and at its pivotal axis is provided with an offset pair of actuating arms 34 and 35 fixed to the arm 32. When the rod 13 is in its lowermost position, the switch arm 32 is tilted away from the fixed contact 31 by means of a block 36, mounted on the rod 13 and having a channel 37 in which the actuating arms 34 and 35 are received.

The vertical walls of the channel 37 are so positioned that one wall 38 engages the arm 34 and deflects it to a position to swing the switch arm 32 out of contact with the contact 31 as shown in Figs. 3 and 4.

When the rod 13 is moved upwardly by the solenoid core 11 it carries the block 36 upwardly and when the lower edge of the wall 38 passes above the pivotal point of the actuating arm 32 the latter is released and the switch arm 32 is swung by the spring 33 into contact with the contact 31. The welding current control circuit is thus closed through the wires 17 and 18.

The circuit remains closed through the wires 17 and 18 until the further upward movement of the rod 13 brings a block 39 into engagement with, and lifts, the actuating arm 35 to thereby swing the switch arm 32 to the position shown in Fig. 2. The blocks 36 and 39 are adjustably mounted on, and secured, to the rod 13 by means of set screws 40 and 41, respectively, so that by loosening these set screws the positions of the blocks 36 and 39 on the rod 13 may be adjusted to open and close the switch 32 at any desired points in the upward travel of the solenoid core.

It will be understood that when the welding has been completed and the rod 13 descends the circuit through the wires 17 and 18 may be opened at some other point. To avoid a sudden shock of the block 36 engaging the arm 34 the lower edge of the wall 38 of block 36 is rounded as at 42.

Through the above invention the application of the welding current may be accurately timed relatively to the pressure application so that the required pressure is applied prior to or at the time the welding current is applied and premature heating and burning of the metal are avoided. With the above invention, also, the time of application of the welding current and the pressure at which it is applied may be easily adjusted to suit the requirements of different welding operations.

Having described the invention, what I claim and desire to secure by Letters Patent is:—

1. In a welding apparatus including a movable pressure application element and a welding current control circuit cooperating therewith, a switch for controlling the application of welding current, means actuated by said movable pressure element to close and open said switch at definite independent points in its path of travel and means to adjust the points at which said switch is closed and opened.

2. In welding apparatus including a movable pressure applying element, and a welding current control circuit cooperative therewith, a switch, a rod carried by said movable element, and means adjustably mounted on said rod to actuate said switch at determined successive points in the movement of said rod.

3. In welding apparatus including a movable pressure applying element, and a welding current control circuit cooperative therewith, a switch, a rod carried by said movable element, and means adjustably mounted on said rod to actuate said switch at determined successive points in the movement of said rod and means to adjust said rod relatively to said moving element.

4. In welding apparatus including a movable pressure applying element and a welding current control circuit cooperative therewith, a switch, a rod carried by said movable element, and means adjustably mounted on said rod to close and to open said switch at determined successive points in the movement of said rod and means for adjusting said switch relatively to the movement of said rod.

5. In welding apparatus including a movable element and a welding current control circuit cooperative therewith, a pair of switches in series, a means actuated by said movable element to successively close one switch and open the other at determined successive points in its path of travel.

6. In welding apparatus including a movable element, and a welding current control circuit cooperative therewith, a pair of switches in series, a means actuated by said movable element to successively close one switch and open the other at determined points in its path of travel, and means for adjusting the position of said points.

7. In welding apparatus including a movable pressure applying means, and a welding current control circuit cooperative therewith, means operable directly by said movable pressure applying means independently to close and open said control circuit at definite successive positions of said pressure applying means.

8. In welding apparatus including a movable pressure applying means, and a welding current control circuit cooperative therewith, means connected directly to said movable pressure applying means independently to close and open a switch in said control circuit at definite successive positions of said pressure applying means.

9. In welding apparatus including a movable pressure applying means, and a welding current control circuit cooperative therewith means operable directly by said movable pressure applying means independently to close and open said control circuit at definite successive positions of said pressure applying means, and means for adjusting independently the opening and closing position of said means.

In witness whereof, I have hereunto signed my name.

ALBERT A. SMITH.